United States Patent
Mori (10) Patent No.: US 8,162,341 B2
(45) Date of Patent: Apr. 24, 2012

(54) STEERING DAMPER ATTACHMENT STRUCTURE

(75) Inventor: Yotaro Mori, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 309 days.

(21) Appl. No.: 12/058,236

(22) Filed: Mar. 28, 2008

(65) Prior Publication Data

US 2008/0238025 A1 Oct. 2, 2008

(30) Foreign Application Priority Data

Mar. 30, 2007 (JP) .................................. 2007-092765

(51) Int. Cl.
*B62K 21/08* (2006.01)

(52) U.S. Cl. ............................ 280/272; 280/276; 280/90

(58) Field of Classification Search .................. 280/271, 280/272, 276, 89, 90; 180/219
See application file for complete search history.

(56) References Cited

U.S. PATENT DOCUMENTS

| 4,558,878 A * | 12/1985 | Motrenec ..................... 280/272 |
| 5,354,084 A * | 10/1994 | Lofgren et al. ............... 280/250 |
| 2005/0151341 A1* | 7/2005 | Iwamoto et al. .............. 280/272 |
| 2005/0212250 A1* | 9/2005 | Gogo et al. ................... 280/272 |
| 2008/0054590 A1* | 3/2008 | Mori et al. ................... 280/272 |
| 2008/0054591 A1* | 3/2008 | Fuse et al. .................... 280/272 |

FOREIGN PATENT DOCUMENTS

JP 2005-96735 A 4/2005

* cited by examiner

*Primary Examiner* — Anne Marie M Boehler (74) *Attorney, Agent, or Firm* — Westerman, Hattori, Daniels & Adrian, LLP (57) ABSTRACT

Disclosed is an attachment structure of a steering damper for a vehicle. The steering damper is provided between a top bridge and a head pipe. The top bridge rotates about a steering stem in conjunction with the operation of a handlebar, while the head pipe does not rotate in conjunction with the operation of the handlebar. In the attachment structure, in a state where the steering angle of the handlebar is zero, the axis of the steering damper forms an obtuse angle with the axis of a bolt to which an upper portion of the steering damper is attached.

19 Claims, 6 Drawing Sheets

STEERING DAMPER ATTACHMENT STRUCTURE

TECHNICAL FIELD

The present invention relates to an improvement in a steering damper attachment structure.

BACKGROUND OF THE INVENTION

There is a conventional steering damper attachment structure in which a steering damper is attached to a head pipe on the vehicle body frame side, and to a bottom bridge constituting a front fork (for example, see Japanese Patent Application Laid-open Publication No. 2005-96735).

The conventional steering damper attachment structure will be described with reference to Japanese Patent Application Laid-open Publication No. 2005-96735.

A cylindrical damper is constituted of a damper case and a damper rod that is slidably disposed to move in and out of the damper case. The upper end of the damper case is rotatably joined with a spherical joint, to a stay extending frontward from a head pipe. The lower end of the damper case is rotatably joined with a spherical joint, to a stay extending frontward from a bottom bridge. The cylindrical damper is also arranged in front of the head pipe, and substantially along the longitudinal direction of the head pipe.

The center axis of the cylindrical damper is substantially perpendicular to the axis extending along the longitudinal direction of each of the stays. Accordingly, each of the spherical joints is in a stationary state at the center of the rotation range thereof. When the handlebar is turned from this state, the stay on the bottom bridge side rotates. In conjunction with the rotation of the stay, each of the spherical joints rotates from the center of the rotation range. If the maximum angle on each side of the rotation range of the spherical joints is smaller than the maximum angle on the side of the steering range of the handlebar, the steering angle of the handlebar is restricted by the rotation range of each of the spherical joints.

Increasing the rotation range on each side of each of the spherical joints makes it possible to increase the steering angle of the handlebar. An object of the present invention is to further increase the steering angle of a handlebar.

An embodiment of the present invention provides a steering damper attachment structure for a vehicle. The structure includes a steering stem, a steering-side member, a vehicle-body-side member, and a steering damper. The steering-side member rotates about the steering stem in conjunction with the operation of a handlebar. The vehicle-body-side member does not rotate in conjunction with the operation of the handlebar. The steering damper is provided between the steering-side member and the vehicle-body-side member. In this structure, in a state where the steering angle of the handlebar is zero, the axis of the steering damper forms an obtuse angle relative to the axis of an attachment portion of the steering-side member to which the steering damper is attached.

Furthermore, in a state where the steering angle of the handlebar is zero, the axis of the steering damper forms an obtuse angle relative to the axis of an attachment portion of the vehicle-body-side member to which the steering damper is attached.

The operation of the present invention will be described below. In a state where the steering angle of the handlebar is zero, the axis of the steering damper forms an obtuse angle with the axis of an attachment portion of the steering side member to which the steering damper is attached. In this case, when the handlebar is operated from the state of the steering angle of zero, the angle of the axis of the steering damper to the axis of the attachment portion on the steering-side member side is gradually reduced. At this time, the swing angle of the steering damper to the swing limit is increased in comparison to the case where the axis of the steering damper forms a right angle with the axis of the attachment portion on the steering-side member side According to the aspect of the present invention, in a state where the steering angle of the handlebar is zero, the axis of the steering damper forms an obtuse angle with the axis of an attachment portion on the steering-side member to which the steering damper is attached. With this configuration, when a spherical plain bearing is provided at the joint portion between the steering damper and the steering-side member, the available range of the swing angle of the spherical plain bearing is increased. The steering angle of the handlebar can thus be increased, while the steering angle has been restricted by the maximum swing angle of the spherical plain bearing.

Accordingly, it is possible to reduce the minimum turning radius of the vehicle, and to thus improve the handling of the vehicle.

BRIEF DESCRIPTION OF THE DRAWINGS

The advantages of the invention will become apparent in the following description taken in conjunction with the drawings, wherein.

DETAILED DESCRIPTION OF THE INVENTION

A preferred embodiment for carrying out the present invention will be described below with reference to the accompanying drawings. Note that each of the drawings should be viewed in the direction of the orientation of the reference numerals.

Figure 1:
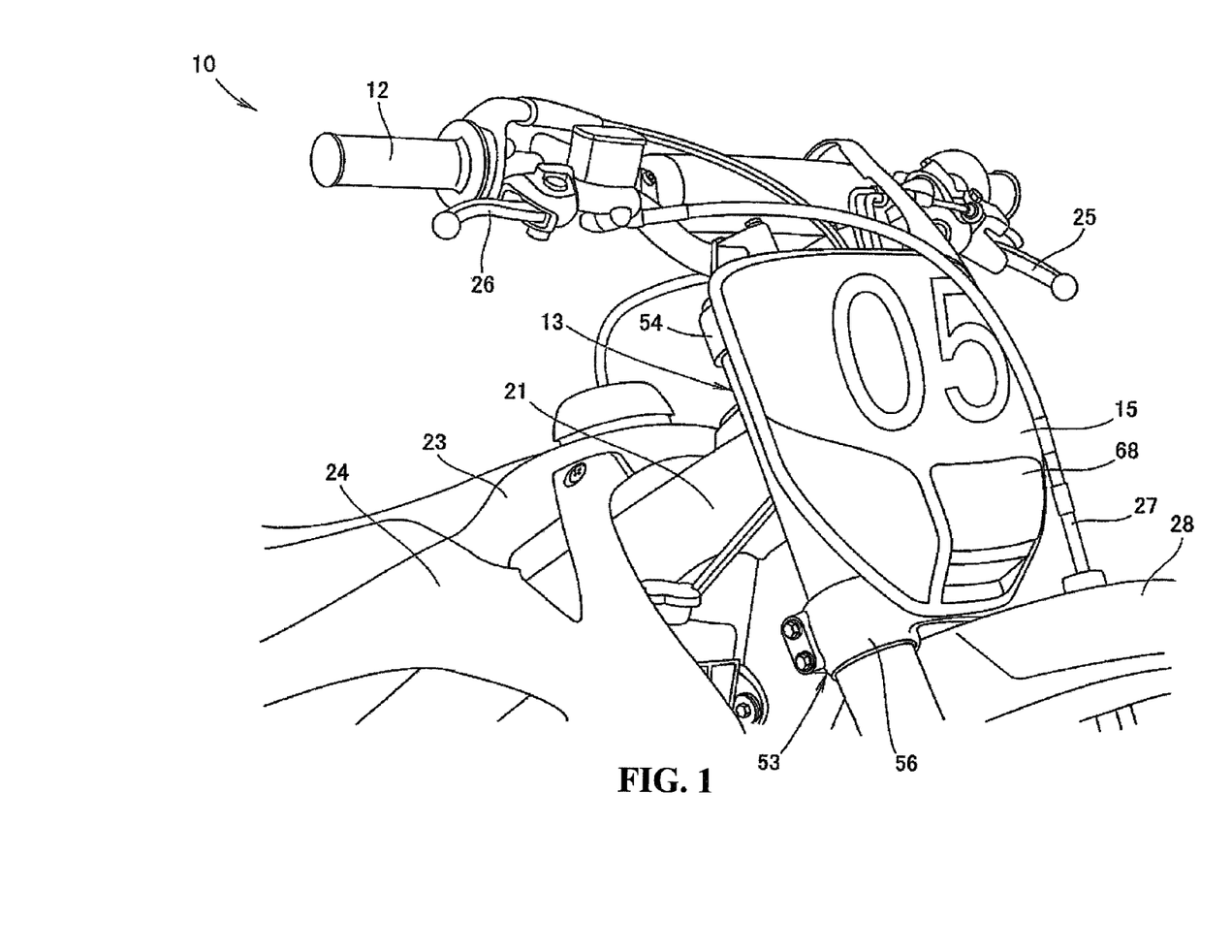
FIG. 1 is a perspective view of the front side of a vehicle provided with a steering damper according to the present invention.

FIG. 1 is a perspective view of the front side of a vehicle provided with a steering damper according to the present invention. A vehicle 10, for example, is an off-road motorcycle. In the vehicle 10, a steering damper (not illustrated) to be described later is attached to an upper portion of a front fork 13. A front wheel is supported at the lower end of the front fork 13, and, concurrently, a handlebar 12 serving as a steering handlebar is attached to the upper end of the front fork 13. A racing number plate 15 with a racing number drawn thereon may be arranged to cover the front side of the steering damper.

In FIG. 1, reference numeral 21 denotes a vehicle body frame 21 serving as a frame of the vehicle 10. The front fork 13 is steerably attached to a head pipe (not illustrated) provided to the front end of the vehicle body frame 21.

In FIG. 1, reference numerals 23 to 28 denote a fuel tank, a cowl, a clutch lever, a front-wheel brake lever, a brake hose, and a front fender, respectively. The fuel tank 23 is attached to an upper portion of the vehicle body frame 21. The cowl 24 covers the side portions of the front side of the vehicle body. The clutch lever 25 and the front-wheel brake lever 26 are attached to the handlebar 12. The brake hose 27 transmits, as a brake hydraulic pressure, the operational power of the front-wheel brake lever 26 to a brake caliper arranged on the front wheel side. The front fender 28 covers the upper side of the front wheel.

Figure 2:
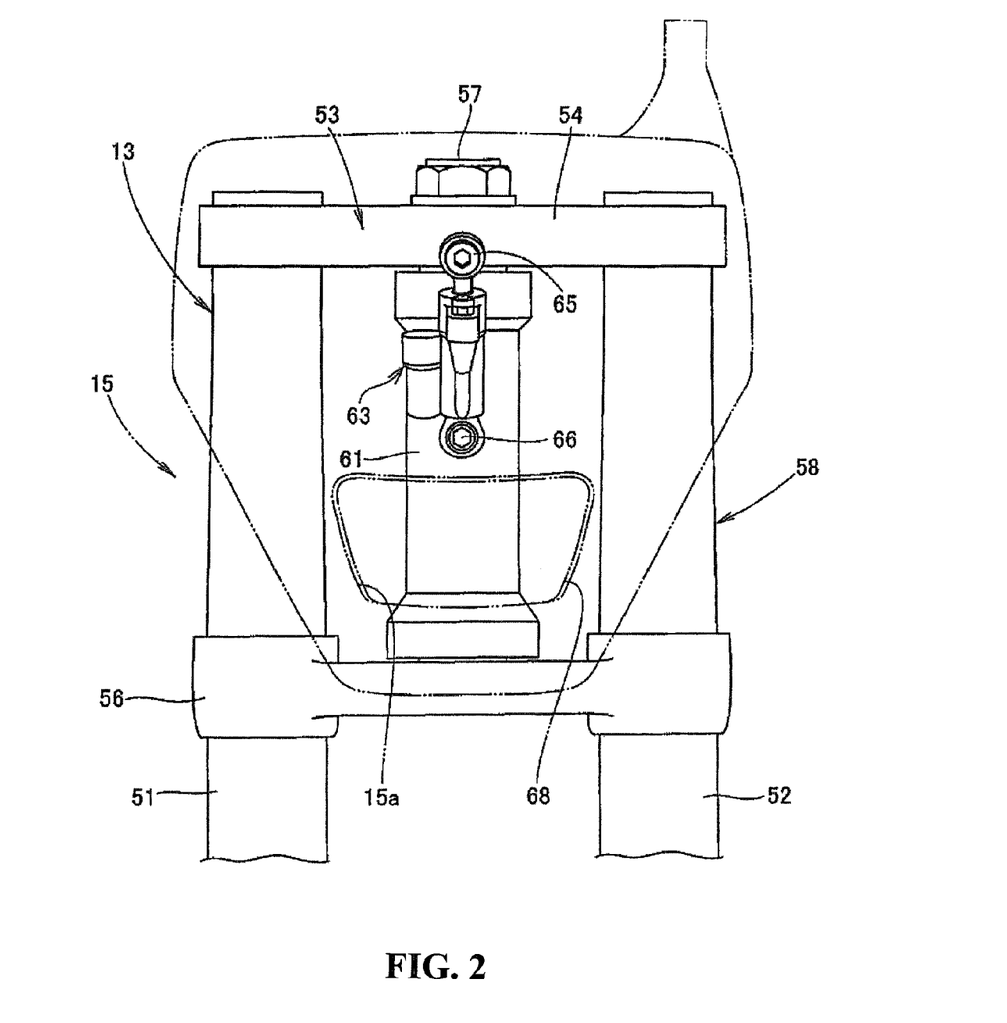
FIG. 2 is an explanatory view showing the front portion of the vehicle according to the present invention.

FIG. 2 is an explanatory view showing the front portion of the vehicle according to the present invention. The front fork 13 is constituted of a pair of left and right fork pipes 51 and 52, a fork bridge 53, and a steering stem 57. The front wheel is attached to the lower ends of the fork pipes 51 and 52 with an axle shaft. The fork bridge 53 joins the upper portions of these fork pipes 51 and 52 to each other, and also is constituted of a top bridge 54 and a bottom bridge 56, both made of an aluminum alloy. The top bridge 54 constitutes a steering-side member. The steering stem 57 is attached to extend, as a rotating shaft, up and down between the center portions of the respective top and bottom bridges 54 and 56.

The steering stem 57 is a component rotatably attached to the head pipe 61 attached to the front end of the vehicle body frame 21 (see FIG. 1). The head pipe 61 constitutes a vehicle-body-side member.

The front fork 13, the handlebar 12 (see FIG. 1), and the head pipe 61 are components constituting a steering mechanism 58 for steering the front wheel.

The steering damper 63 is attached between the top bridge 54 and the head pipe 61. The steering damper 63 is a shock absorber for mitigating a force in the steering direction, which is suddenly exerted on the front fork 13 and the handlebar 12 via the front wheel from the ground surface. The steering damper 63 is fastened to the top bridge 54 with a bolt 65, and to the head pipe 61 with a bolt 66.

Figure 3:
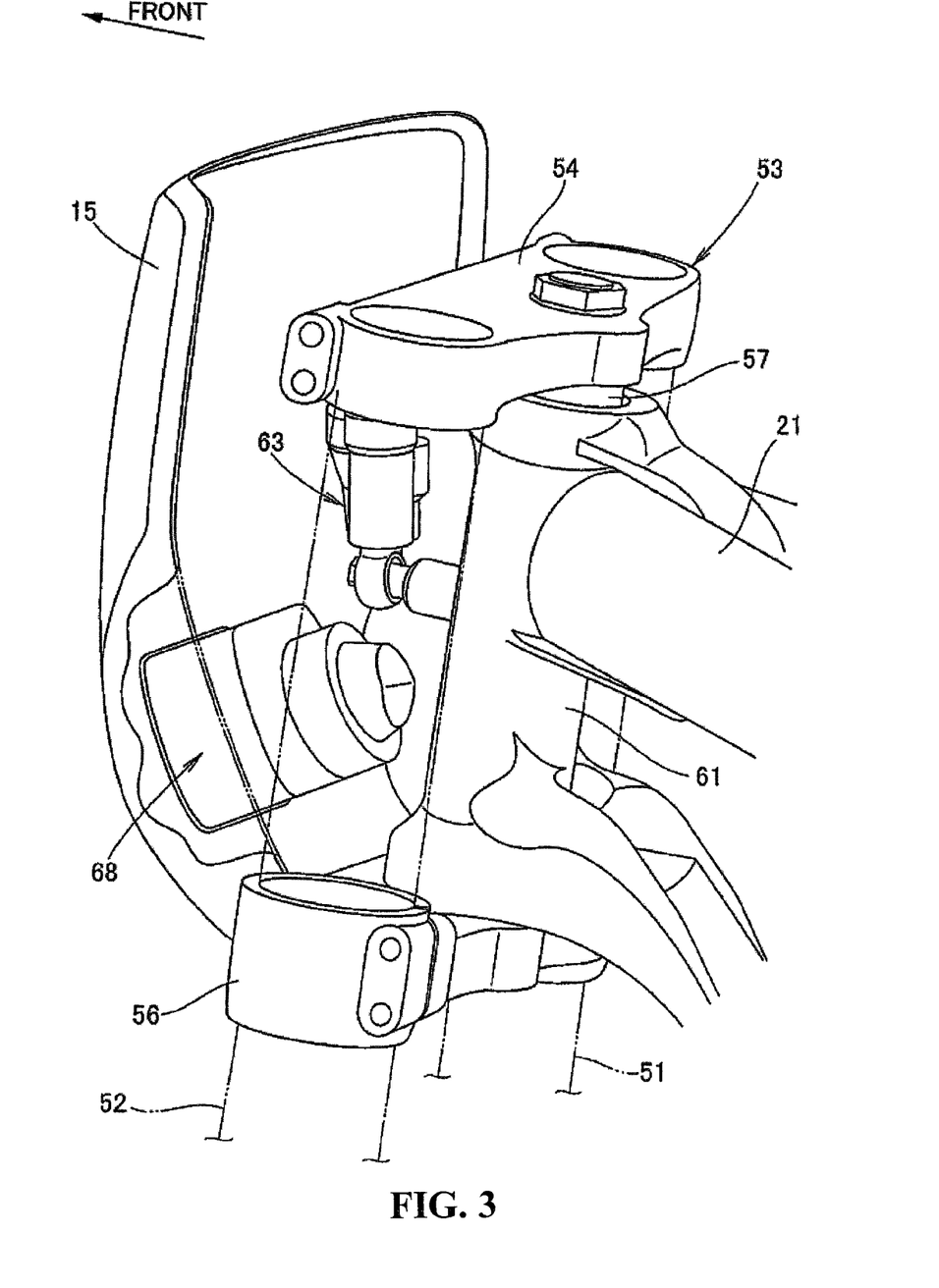
FIG. 3 is a perspective view showing the front portion of the vehicle according to the present invention.

FIG. 3 is a perspective view showing the front portion of the vehicle according to the present invention (in FIG. 3, the arrow (FRONT) indicates a direction to the front side of the vehicle, and the same shall apply hereinafter). A lighting unit 68 is arranged below the steering damper 63 and in front of the head pipe 61.

The lighting unit 68 is a light-weight illumination device for motor racing, and illuminates the ground surface in front of the vehicle. Since the front side of the steering damper 63 is covered with the racing number plate 15, the steering damper 63 is protected from being hit by flying stones and the like.

Figure 4:
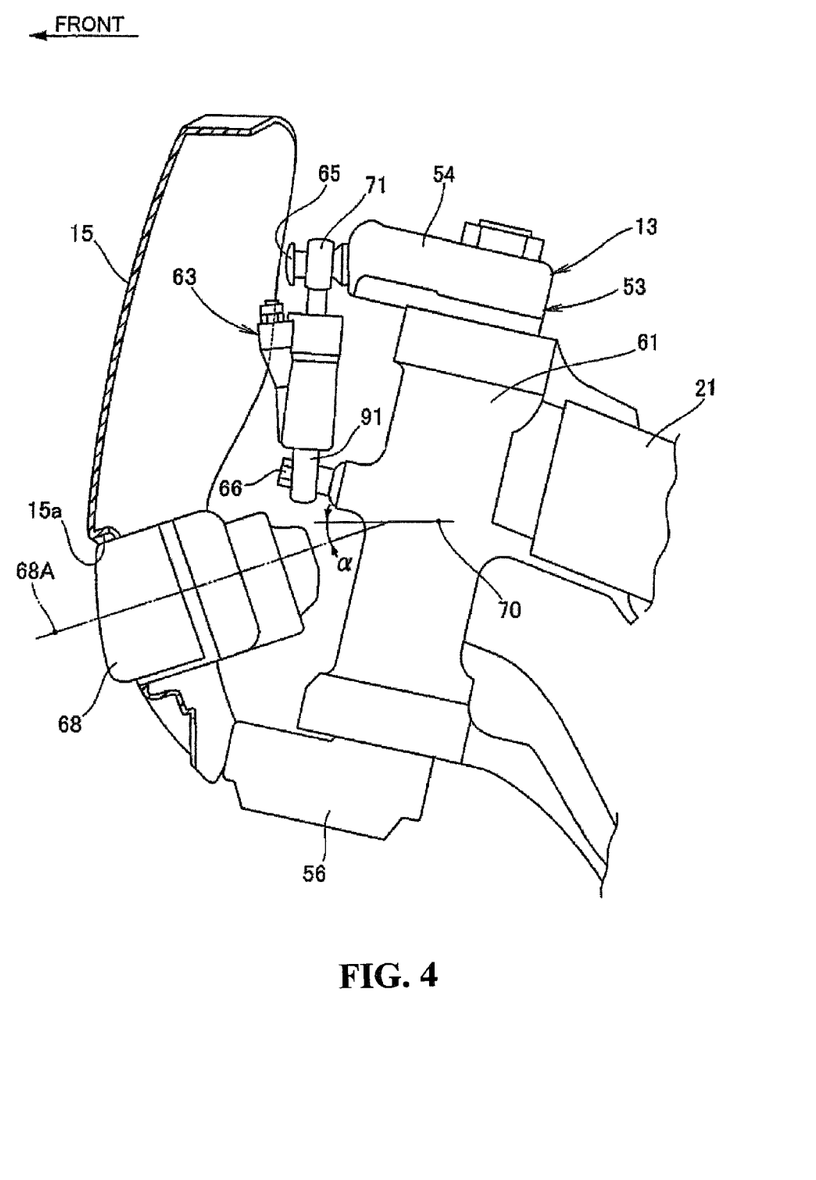
FIG. 4 is a side view showing the front portion of the vehicle according to the present invention.

FIG. 4 is a side view showing the front portion of the vehicle according to the present invention. The steering damper 63 is swingably attached to the front portion of the head pipe 61, and to the front portion of the top bridge 54. The steering damper 63 is also arranged closer to the top bridge 54 between the top bridge 54 and the bottom bridge 56. The lighting unit 68 is arranged below the steering damper 63 and closer to the bottom bridge 56, between the top bridge 54 and the bottom bridge 56. The front area extending from the top bridge 54 to the bottom bridge 56 is covered with the racing number plate 15 (shown here in a cross section).

The lighting unit 68 is attached to the racing number plate 15, and is also exposed to the front portion of the vehicle from a window portion 15*a* which is opened in the racing number plate 15.

The optical axis 68A (coinciding with the axis of a light bulb) of the lighting unit 68 is inclined at a lighting angle α to a horizontal line 70.

As to the steering damper 63, a first end portion thereof attached to the head pipe 61 is arranged closer to the head pipe 61 side than a second end portion thereof attached to the top bridge 54. Accordingly, while the head pipe 61 is inclined to the vertical direction, the steering damper 63 is attached in a substantially vertical state. For this reason, the first end portion, attached to the head pipe 61, of the steering damper 63 does not protrude so much from the front side of the vehicle. This makes it possible to arrange the racing number plate 15 closer to the head pipe 61 side, and to thus reduce the size of the front portion of the vehicle.

Figure 5:
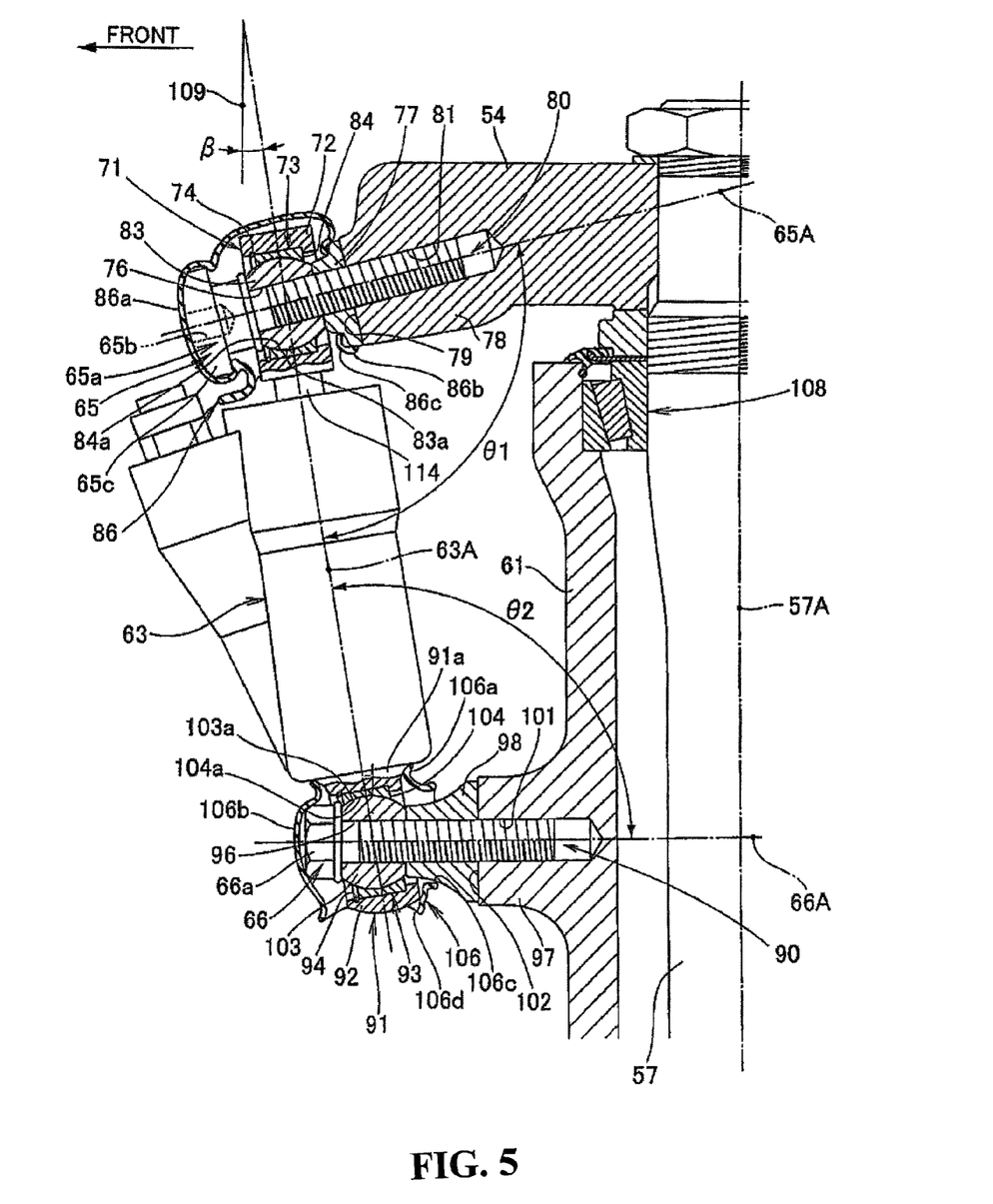
FIG. 5 is a cross-sectional view showing a steering damper attachment structure according to the present invention.

FIG. 5 is a cross-sectional view (a partially side view) showing the steering damper attachment structure according to the present invention. The steering damper 63 is attached, at an upper end attachment portion 71 thereof, to the top bridge 54. The upper end attachment portion 71 is constituted of an upper annular portion 72, a spherical plain bearing 73, and a snap ring 74. The spherical plain bearing 73 is fitted into the upper annular portion 72, and also is fixed to the upper annular portion 72 by the snap ring 74. A bolt insertion hole 76 is formed in the spherical plain bearing 73, while an upper attachment portion 78 is formed in the top bridge 54. The upper end attachment portion 71 is attached to the upper attachment portion 78 with a collar 77 in between by the bolt 65 inserted through the bolt insertion hole 76. It should be noted that reference numerals 79 and 81 denote an attachment surface and a female thread, respectively. The attachment surface 79 is formed in the end portion of the upper attachment portion 78 so as to receive the collar 77. The female thread 81 is formed in the upper attachment portion 78 so as to allow the bolt 65 to be screwed into the upper attachment portion 78.

The bolt 65 and the upper attachment portion 78 collectively serve as an attachment portion 80 to which the upper end of the steering damper 63 is attached on the top bridge 54 side. The axis of the attachment portion 80 is the same as the axis 65A of the bolt 65.

The spherical plain bearing 73 is constituted of an inner ring 83 and an outer ring 84. The inner ring 83 has an outer surface 83*a* in which part of a convex spherical surface is formed. On the other hand, the outer ring 84 has an inner surface 84*a* in which part of a concave spherical surface is formed to be slidably fitted onto the outer surface 83*a* of the inner ring 83. The inner ring 83 has the bolt insertion hole 76, and the outer ring 84 is fitted into the upper annular portion 72.

The upper end attachment portion 71, a head portion 65*a* of the bolt 65, and part of the collar 77 are covered with a rubber-made upper boot 86. In FIG. 5, reference numerals 65*b* and 65*c* denote a hexagon socket and a large diameter portion, respectively. Both of the hexagon socket 65*b* and the large diameter portion 65*c* are formed in the head portion 65*a*.

The upper boot 86 includes a bolt fitting portion 86*a*, a collar fitting portion 86*b*, and an opening portion 86*c*. The bolt fitting portion 86*a* is fitted onto the large diameter portion 65*c* of the bolt 65. The collar fitting portion 86*b* is fitted onto the collar 77. The opening portion 86*c* is provided for water discharge. The upper boot 86 protects the upper end attachment portion 71 from rainwater, dust, and the like. Rainwater that has entered the inside of the upper boot 86 is discharged from the opening portion 86*c*.

The steering damper 63 includes a lower end attachment portion 91 attached to the head pipe 61. The lower end attachment portion 91 is constituted of a lower annular portion 92, a spherical plain bearing 93, and a snap ring 94. The spherical plain bearing 93 is fitted into the lower annular portion 92, and also is fixed to the lower annular portion 92 by the snap ring 94. A bolt insertion hole 96 is formed in the spherical plain bearing 93, while a lower attachment portion 97 is formed in the head pipe 61. The lower end attachment portion 91 is attached to the lower attachment portion 97 with a collar 98 in between by the bolt 66 inserted through the bolt insertion hole 96. It should be noted that Reference numerals 101 and 102 denote a female thread and an attachment surface, respectively. The female thread 101 is formed in the lower attachment portion 97 so as to allow the bolt 66 to be screwed into the lower attachment portion 97. The attachment surface 102 is formed in the lower attachment portion 97 so as to receive the collar 98.

The bolt 66 and the lower attachment portion 97 collectively serve as an attachment portion 90 to which the lower end of the steering damper 63 is attached on the head pipe 61 side. The axis of the attachment portion 90 is the same as the axis 66A of the bolt 66.

The spherical plain bearing 93 is constituted of an inner ring 103 and an outer ring 104. The inner ring 103 has an outer surface 103a in which part of a convex spherical surface is formed. On the other hand, the outer ring 104 has an inner surface 104a in which part of a concave spherical surface is formed to be slidably fitted onto the outer surface 103a of the inner ring 103. The inner ring 103 has the bolt insertion hole 96, and the outer ring 84 is fitted to the lower annular portion 92.

The lower end attachment portion 91, a head portion 66a of the bolt 66, and part of the collar 98 are covered with a rubber-made lower boot 106.

The lower boot 106 includes a base fitting portion 106a, a head abutting portion 106b, a lateral opening portion 106c, and a lower opening portion 106d. The base fitting portion 106a is fitted onto a base portion 91a of the lower end attachment portion 91. The head abutting portion 106b is caused to abut on the head portion 66a of the bolt 66. The lateral opening portion 106c opens in a manner of avoiding the collar 98. The lower opening portion 106d opens downward to discharge water therethrough. The lower boot 106 protects the lower end attachment portion 91 from rainwater, dust, and the like. Rainwater that has entered the inside of the lower boot 106 is discharged from the lower opening portion 106d.

In FIG. 5, reference numeral 108 denotes a tapered roller bearing provided between the steering stem 57 and the head pipe 61.

When the steering angle of the handlebar is zero, the axis 63A of the steering damper 63 is inclined, in the side view, at an angle of β to a straight line 109 parallel to the axis 57A of the steering stem 57 (and the head pipe 61). In other words, the axis 63A is inclined at the angle of β to the axis 57A.

This inclination is due to the arrangement of the lower end attachment portion 91 of the steering damper 63 closer to the axis 57A than the upper end attachment portion 71.

The angle θ1 between the axis 63A of the steering damper 63 and the axis 65A of the bolt 65 is set at an obtuse angle, that is, an angle larger than 90°, when the steering angle of the handlebar is zero. Concurrently, the angle θ2 between the axis 63A of the steering damper 63 and the axis 66A of the bolt 66 is also set at an obtuse angle. The reason for this setting will be described later.

Figure 6:
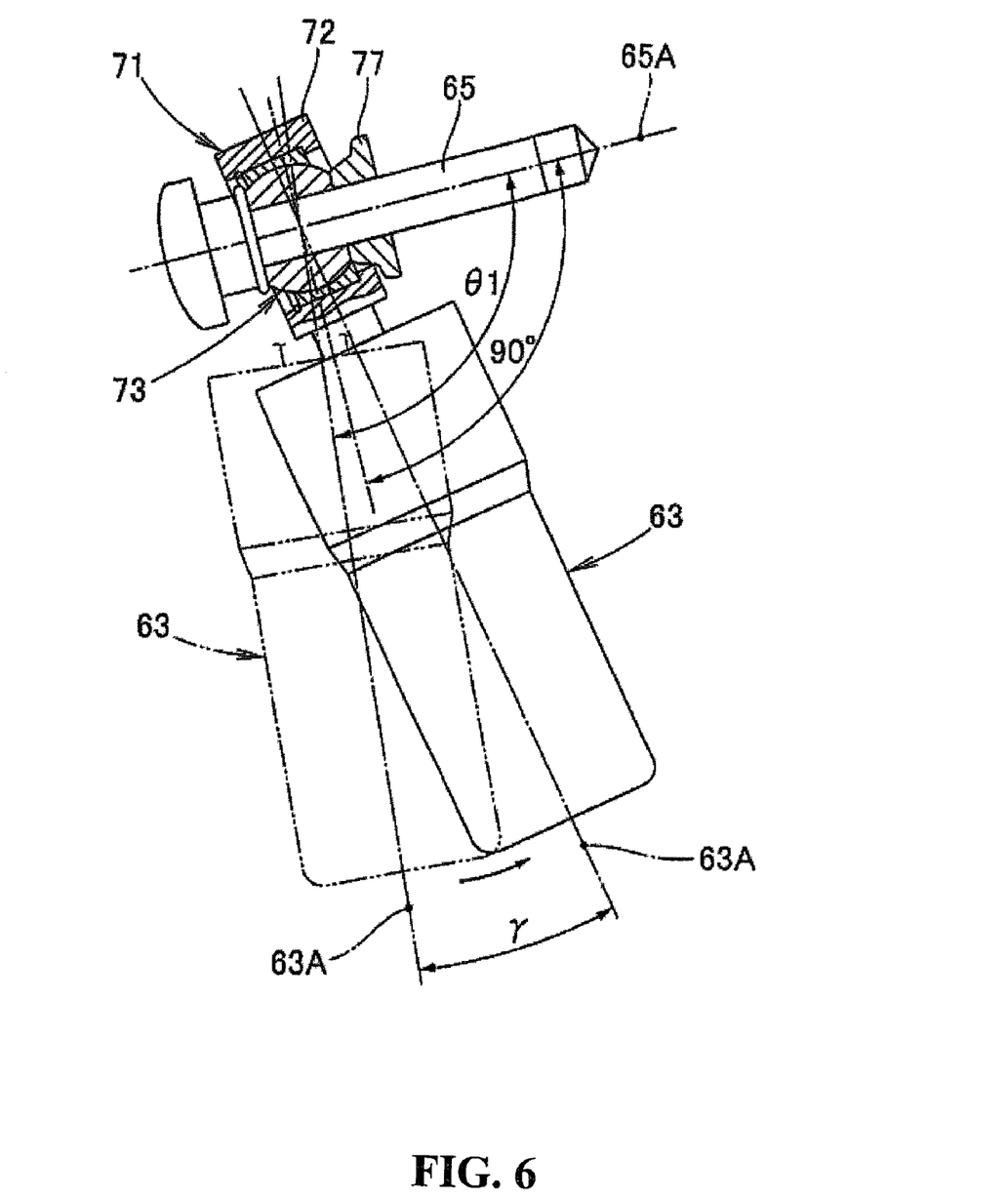
FIG. 6 is an operational view for explaining the operation of the steering damper attachment structure according to the present invention.

FIG. 6 is an operational view for explaining the operation of the steering damper attachment structure according to the present invention. When the handlebar is operated from a state where the steering angle of the handlebar is zero, the top bridge rotates with respect to the head pipe. In conjunction with the rotation, the steering damper 63 swings as indicated by the arrows, so that the angle between the axis 63A of the steering damper 63 and the axis 65A of the bolt 65 is reduced. If the steering damper 63 continued to swing, the upper annular portion 72 of the steering damper 63 would eventually hit the collar 77, so that the swing angle γ of the steering damper 63 would reach the maximum. However, since the steering angle of the handlebar is restricted, the upper annular portion 72 never hits the collar 77.

In the present invention, the angle θ1 between the axis 63A of the steering damper 63 and the axis 65A of the bolt 65 is set at an obtuse angle in a state where the steering angle of the handlebar is zero. This makes it possible to increase the swing angle γ of the steering damper 63, and to thus further increase the steering angle of the handlebar, in comparison to, for example, a case where the angle between the axis 63A of the steering damper 63 and the axis 65A of the bolt 65 is set at a right angle, so that the steering damper 63 is positioned at the center of the range of the swing angle of the spherical plain bearing 73.

On the other hand, the angle between the axis 63A of the steering damper 63 and the axis 66A of the bolt 66 is set at an obtuse angle, as shown in FIG. 5, also because of the same reason as described above.

The steering damper attachment structure of the present invention is preferably applied to a motorcycle.

Although a specific form of embodiment of the instant invention has been described above and illustrated in the accompanying drawings in order to be more clearly understood, the above description is made by way of example and not as a limitation of the scope of the instant invention. It is contemplated that various modifications apparent to one of ordinary skill in the art could be made without departing from the scope of the invention which is to be determined by the following claims.

I claim:

1. A steering damper attachment structure for a vehicle, comprising:
   a steering stem;
   a steering-side member rotatable about said steering stem in conjunction with the operation of a handlebar;
   a vehicle-body-side member not rotatable in conjunction with the operation of said handlebar; and
   a steering damper between said steering-side member and said vehicle-body-side member,
   wherein a quadrilateral is defined by a longitudinal axis of said steering damper, a longitudinal axis of an attachment portion of said steering-side member to which said steering damper is attached, a longitudinal axis of an attachment portion of said vehicle-body-side member to which said steering damper is attached, and a longitudinal axis of said steering stem,
   wherein an interior angle of said longitudinal axis of said steering damper and said longitudinal axis of said attachment portion of said steering-side member is an obtuse angle, in a state where the steering angle of said handlebar is zero,
   wherein said axis of said steering damper is oblique with respect said axis of said steering stem, and
   wherein said steering-side member is disposed above said vehicle-body-side member.

2. The steering damper of claim 1, wherein an interior angle of the longitudinal axis of said steering damper and said longitudinal axis of said attachment portion of said vehicle-body-side member is an obtuse angle, in a state where the steering angle of said handle bar is zero.

3. The steering damper of claim 1, wherein the obtuse angle which is the interior angle of the longitudinal axis of said steering damper and the longitudinal axis of said attachment portion of said steering-side member is reduced as the steering angle of said handle bar increases.

4. The steering damper of claim 1, wherein said steering damper is connected to said steering-side member using a spherical plain bearing.

5. The steering damper of claim 1, wherein said steering damper is connected to said vehicle-body-side member using a spherical plain bearing.

6. The steering damper of claim 1, wherein an interior angle of said longitudinal axis of said attachment portion of said steering-side member and said longitudinal axis of said steering stem is an acute angle, in a state where the steering angle of said handle bar is zero.

7. The steering damper of claim 2, wherein an interior angle of said longitudinal axis of said attachment portion of said steering-side member and said longitudinal axis of said steering stem is an acute angle, in a state where the steering angle of said handle bar is zero.

8. The steering damper of claim 1, wherein said longitudinal axis of said steering damper approaches said longitudinal axis of said steering stem towards the vehicle downward direction of said vehicle.

9. The steering damper of claim 2, wherein said longitudinal axis of said steering damper approaches said longitudinal axis of said steering stem towards the vehicle downward direction of said vehicle.

10. The steering damper of claim 6, wherein said longitudinal axis of said steering damper approaches said longitudinal axis of said steering stem towards the vehicle downward direction of said vehicle.

11. The steering damper of claim 7, wherein said longitudinal axis of said steering damper approaches said longitudinal axis of said steering stem towards the vehicle downward direction of said vehicle.

12. The steering damper of claim 1, wherein said attachment portion of said steering-side member and said attachment portion of said vehicle-body-side member are bolts.

13. The steering damper of claim 2, wherein said attachment portion of said steering-side member and said attachment portion of said vehicle-body-side member are bolts.

14. The steering damper of claim 6, wherein said attachment portion of said steering-side member and said attachment portion of said vehicle-body-side member are bolts.

15. The steering damper of claim 7, wherein said attachment portion of said steering-side member and said attachment portion of said vehicle-body-side member are bolts.

16. The steering damper of claim 8, wherein said attachment portion of said steering-side member and said attachment portion of said vehicle-body-side member are bolts.

17. The steering damper of claim 9, wherein said attachment portion of said steering-side member and said attachment portion of said vehicle-body-side member are bolts.

18. The steering damper of claim 10, wherein said attachment portion of said steering-side member and said attachment portion of said vehicle-body-side member are bolts.

19. The steering damper of claim 11, wherein said attachment portion of said steering-side member and said attachment portion of said vehicle-body-side member are bolts.

* * * * *